(12) United States Patent
Imiya et al.

(10) Patent No.: US 11,432,128 B2
(45) Date of Patent: Aug. 30, 2022

(54) INFORMATION PROCESSING DEVICE AND INFORMATION PROCESSING METHOD

(71) Applicant: Sony Corporation, Tokyo (JP)

(72) Inventors: Daisuke Imiya, Tokyo (JP); Katsushige Nakanishi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 159 days.

(21) Appl. No.: 16/770,079

(22) PCT Filed: Sep. 6, 2018

(86) PCT No.: PCT/JP2018/033062
§ 371 (c)(1),
(2) Date: Jun. 5, 2020

(87) PCT Pub. No.: WO2019/116649
PCT Pub. Date: Jun. 20, 2019

(65) Prior Publication Data
US 2020/0389777 A1    Dec. 10, 2020

(30) Foreign Application Priority Data

Dec. 14, 2017    (JP) .............................. JP2017-239831

(51) Int. Cl.
*H04W 4/00*    (2018.01)
*H04W 4/80*    (2018.01)
(Continued)

(52) U.S. Cl.
CPC .............. *H04W 4/80* (2018.02); *H04W 8/005* (2013.01); *H04W 76/11* (2018.02)

(58) Field of Classification Search
CPC ....... H04W 4/80; H04W 8/005; H04W 76/11; H04W 8/00
(Continued)

(56) References Cited

U.S. PATENT DOCUMENTS

| 8,009,560 | B2 * | 8/2011 | Khan | ................. H04L 43/0829 370/230 |
| 8,485,524 | B2 * | 7/2013 | Yamaguchi | .............. B65H 1/04 271/223 |

(Continued)

FOREIGN PATENT DOCUMENTS

| JP | 2001-243569 A | 9/2001 |
| JP | 2007-124326 A | 5/2007 |

(Continued)

OTHER PUBLICATIONS

International Search Report and Written Opinion dated Nov. 6, 2018 for PCT/JP2018/033062 filed on Sep. 6, 2018, 13 pages including English Translation of the International Search Report.

*Primary Examiner* — Marceau Milord
(74) *Attorney, Agent, or Firm* — Xsensus LLP

(57) ABSTRACT

To provide an information processing device that is capable of enhancing reliability of detection processing of detecting a terminal.

An information processing device includes: a first communication unit that transmits, by using a short-distance wireless communication function, a request to a terminal corresponding to identification information obtained beforehand; a determination unit that determines, on the basis of presence/absence of a response from the terminal corresponding to the identification information to the request, whether or not the terminal has been detected; and a second communication unit that transmits, to other devices, a detection result based on the determination of the determination unit.

20 Claims, 8 Drawing Sheets

(51) Int. Cl.
*H04W 76/11* (2018.01)
*H04W 8/00* (2009.01)

(58) Field of Classification Search
USPC .......................................................... 370/329
See application file for complete search history.

(56) References Cited

U.S. PATENT DOCUMENTS

| | | | |
|---|---|---|---|
| 10,075,334 B1* | 9/2018 | Kozura | H04W 12/086 |
| 10,206,214 B2* | 2/2019 | Tachibana | H04W 4/026 |
| 2012/0184209 A1 | 7/2012 | Wengrovitz | |
| 2013/0247117 A1* | 9/2013 | Yamada | G08C 17/02 |
| | | | 725/93 |
| 2015/0054639 A1* | 2/2015 | Rosen | H04M 3/2281 |
| | | | 340/439 |
| 2015/0168538 A1* | 6/2015 | Bradley | G01S 5/18 |
| | | | 367/127 |
| 2015/0333965 A1* | 11/2015 | Lee | H04W 84/12 |
| | | | 370/254 |
| 2016/0021511 A1* | 1/2016 | Jin | H04W 4/021 |
| | | | 455/457 |
| 2016/0283699 A1* | 9/2016 | Levin | H04W 12/08 |
| 2017/0034811 A1 | 2/2017 | Tachibana et al. | |
| 2017/0108235 A1* | 4/2017 | Guan | F24F 11/30 |
| 2017/0228665 A1* | 8/2017 | Levin | G06K 7/10722 |
| 2017/0245280 A1* | 8/2017 | Yi | H04K 3/00 |
| 2018/0005465 A1* | 1/2018 | Truong | H04W 12/08 |
| 2018/0139572 A1* | 5/2018 | Hansen | G07C 1/24 |
| 2018/0191577 A1* | 7/2018 | Herczog | H04L 41/14 |
| 2018/0338237 A1* | 11/2018 | Maheswaranathan | H04W 4/90 |
| 2019/0361694 A1* | 11/2019 | Gordon | G06F 1/1673 |

FOREIGN PATENT DOCUMENTS

| | | |
|---|---|---|
| JP | 2013-005391 A | 1/2013 |
| JP | 2015119263 A | 6/2015 |
| WO | WO-2017204147 A | 11/2017 |

* cited by examiner

INFORMATION PROCESSING DEVICE AND INFORMATION PROCESSING METHOD

CROSS-REFERENCE TO RELATED APPLICATIONS

The present application is based on PCT filing PCT/JP2018/033062, filed Sep. 6, 2018, which claims priority to JP 2017-239831, filed Dec. 14, 2017, the entire contents of each are incorporated herein by reference.

TECHNICAL FIELD

The present disclosure relates to an information processing device and an information processing method.

BACKGROUND ART

Conventionally, there have been proposed various technologies in which information processing is performed while a plurality of devices performs communication using a short-distance wireless communication function. For example, the undermentioned Patent Document 1 discloses the technology in which a movable terminal corrects an azimuth angle measured by itself on the basis of correction data that has been transmitted from a fixedly installed transmission device by using a short-distance wireless communication function. The short-distance wireless communication function can also be used for detection processing of detecting a terminal. Here, typical detection processing of detecting a terminal by using a short-distance wireless communication function will be described. First of all, a transmission device that is fixedly installed cyclically transmits a detection packet by using the short-distance wireless communication function. When a terminal receives the detection packet, the terminal keeps an application always operated, the application detecting the terminal's own position on the basis of the received detection packet. Subsequently, when the terminal receives the detection packet from the transmission device, the terminal detects that the terminal itself is located near the transmission device that is a source of the received detection packet.

CITATION LIST

Patent Document

Patent Document 1: U.S. Unexamined Patent Application Publication No. 2017/0034811 Description

SUMMARY OF THE INVENTION

Problems to be Solved by the Invention

However, the above-described detection processing leaves room for an improvement in reliability. For example, in the above-described detection processing, a transmission subject that transmits the detection packet is formed separately from a detection subject that detects a position of the terminal. Therefore, the reason why the terminal does not receive a detection packet is because the terminal is far away from the transmission device, or because, to begin with, the transmission device does not transmit a detection packet has been unknown.

Accordingly, the present disclosure proposes an information processing device and an information processing method that are capable of enhancing reliability of detection processing of detecting a terminal, and that are novel and improved.

Solutions to Problems

According to the present disclosure, there is provided an information processing device including: a first communication unit that transmits, by using a short-distance wireless communication function, a request to a terminal corresponding to identification information obtained beforehand; a determination unit that determines, on the basis of presence/absence of a response from the terminal corresponding to the identification information to the request, whether or not the terminal has been detected; and a second communication unit that transmits, to other devices, a detection result based on the determination of the determination unit.

In addition, according to the present disclosure, there is provided an information processing method executed by a processor, the information processing method including: by using a short-distance wireless communication function, transmitting a request to a terminal corresponding to identification information obtained beforehand; on the basis of presence/absence of a response from the terminal corresponding to the identification information to the request, determining whether or not the terminal has been detected; and transmitting a detection result based on the determination to other devices.

Effects of the Invention

As described above, according to the present disclosure, the reliability of detection processing of detecting a terminal can be enhanced.

It should be noted that the above effects are not necessarily limitative, and along with or instead of the above effects, any effect described in the present description, or other effects that can be grasped from the present description, may be exhibited.

MODE FOR CARRYING OUT THE INVENTION

Preferred embodiments of the present disclosure will be detailed below with reference to the accompanying drawings. It should be noted that components, described herein and on the drawings, having substantially identical functional configurations are denoted with identical reference numbers, and explanation thereof will not be repeated.

It should be noted that explanations are made in the following order.

1. Outline of the present disclosure
2. Embodiment of the present disclosure
2.1. Configuration example
2.2. Operation example
3. Modified examples
4. Application examples
5. Hardware configuration
6. Summary 1. Outline of the Present Disclosure 1.1. Outline of Information Processing System An information processing system according to an embodiment of the present disclosure will be outlined with reference to FIG. 1. Specifically, an information processing system in which a detection device detects a mobile terminal or the like by short-distance wireless communication, and notifies other mobile terminals or the like of a result of the detection via a cloud server will be described as an example.

Figure 1:
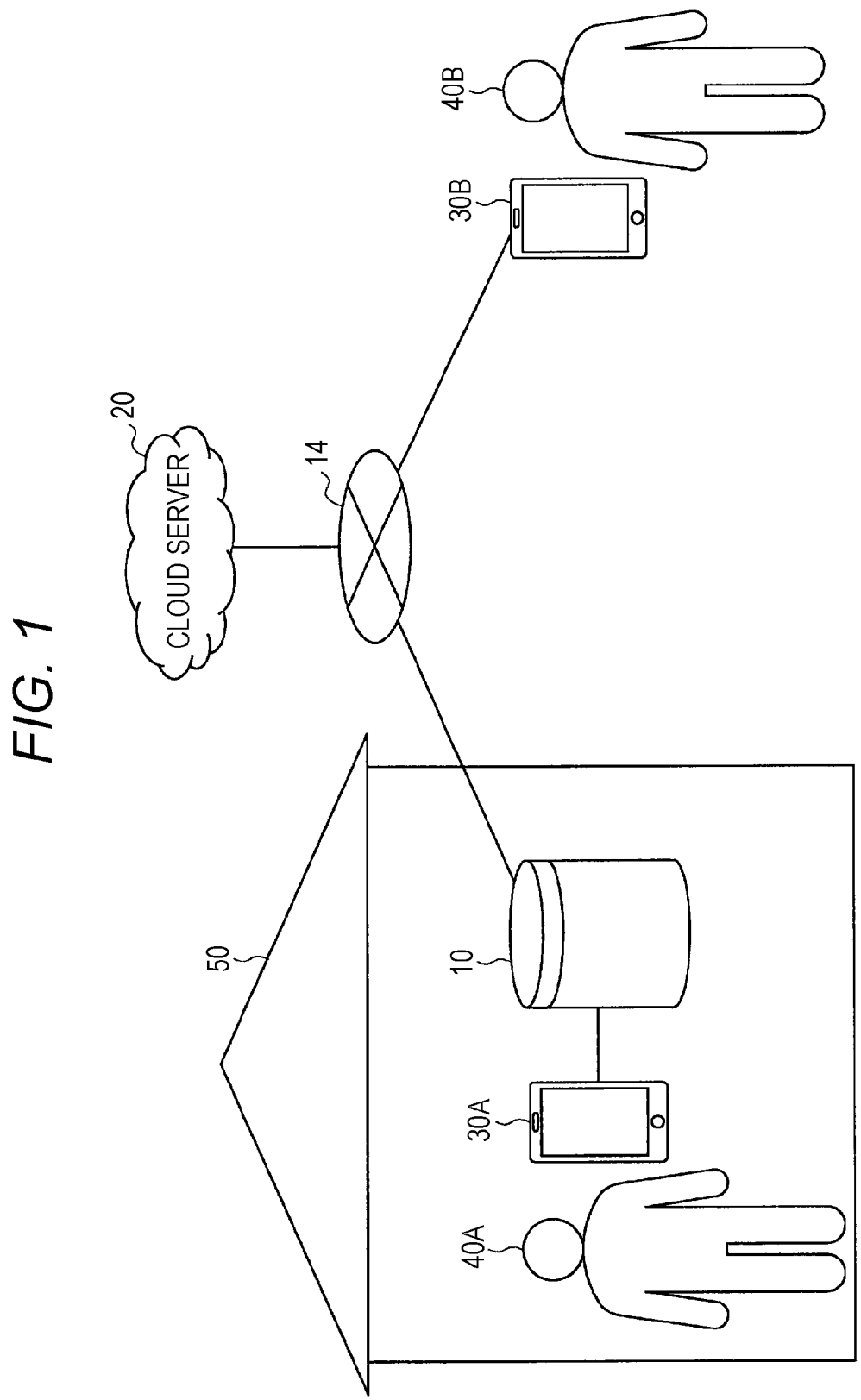
FIG. 1 is an explanatory drawing illustrating an outline of an information processing system according to one embodiment of the present disclosure.

FIG. 1 is an explanatory drawing illustrating an outline of the information processing system according to the embodiment of the present disclosure. As shown in FIG. 1, the information processing system mainly includes a detection device 10, a cloud server 20, mobile terminals 30, and a network 14. In addition, FIG. 1 illustrates the mobile terminals 30 that are detection target detected by the detection device 10, a user 40 who is an owner of the mobile terminal 30, and a house 50 that is a location of the user 40.

The detection device 10 is installed in the house 50 shown in FIG. 1. In addition, a user 40A stays in the house 50, and a mobile terminal 30A is placed near the user 40A. A user 40B carrying a mobile terminal 30B stays out.

The detection device 10 and the mobile terminal 30B are connected to the cloud server 20 through the network 14. In addition, the detection device 10 is connected to the mobile terminal 30B through the network 14. The mobile terminal 30A is in a state of being capable of carrying out short-distance wireless communication with the detection device 10. The state of being capable of carrying out short-distance wireless communication is a state in which the detection device 10 and the mobile terminal 30A exist physically close to each other to such an extent that enables short distance communication, and in which pairing between the detection device 10 and the mobile terminal 30A is completed. Moreover, as with the mobile terminal 30B, the mobile terminal 30A is connected to the cloud server 20 and the detection device 10 through the network 14.

The short-distance wireless communication is wireless communication in which a reaching distance of a wireless signal is short; and the detection device 10 and the mobile terminal 30 according to the embodiment of the present disclosure perform short-distance wireless communications by using Bluetooth. In addition, pairing means performing connection settings between devices provided with Bluetooth, and the detection device 10 performs pairing processing of paring with the mobile terminal 30 to enable communication with the mobile terminal 30.

(1) Detection Device 10

The detection device 10 is an information processing device that detects the mobile terminal 30, and has a function of obtaining information related to detection by using a short-distance wireless communication function. For example, the detection device 10 performs pairing processing of paring with the mobile terminal 30, and obtains information related to the mobile terminal 30. Further, the detection device 10 obtains identification information of the mobile terminal 30 at the time of the pairing processing. The identification information is information that can uniquely identify the mobile terminal 30, and is, for example, address information of Bluetooth with which the mobile terminal 30 is provided. It should be noted that the identification information is not limited to the address information, and any information may be used as identification information. Subsequently, the detection device 10 stores the identification information obtained by the pairing processing in a storage unit.

In addition, for example, the detection device 10 performs detection processing of detecting the mobile terminal 30 to obtain information related to a detection result. The detection processing is processing that detects the mobile terminal 30 by the detection device 10, and the detection device 10 performs detection processing for the mobile terminal 30 corresponding to the identification information obtained by the pairing processing. Specifically, the detection device 10 cyclically transmits a request to the mobile terminal 30 by using the short-distance wireless communication function. Subsequently, on the basis of presence/absence of a response to the request, the detection device 10 determines whether or not the mobile terminal 30 has been detected, and obtains a result of the determination as a detection result.

In addition, the detection device 10 has a function of performing information communication with the cloud server 20. For example, the detection device 10 transmits the detection result of detecting the mobile terminal 30 to the cloud server 20. In this case, on the basis of contents of the detection result, the detection device 10 determines whether or not to transmit the detection result, and controls the detection-result transmission processing according to a result of the determination.

(2) Cloud Server 20

The cloud server 20 is an information processing device that transmits, to the other mobile terminal 30, information related to a location of the user 40 who is an owner of the mobile terminal 30. For example, the cloud server 20 receives, from the detection device 10, the detection result of detecting the mobile terminal 30, and transmits location information of the user 40 of the mobile terminal 30 based on the detection result to the other mobile terminal 30 that is associated with the mobile terminal 30.

In addition, the cloud server 20 has a function of storing information used to transmit the location of the user 40 to the other mobile terminal 30. For example, the cloud server 20 stores information related to the mobile terminal 30. Specifically, the information related to the mobile terminal 30 includes: identification information of the mobile terminal 30; a user name of the user who is the owner of the mobile terminal 30; identification information of the other mobile terminal 30 related to the mobile terminal 30; the detection result of detecting the mobile terminal 30; and the like.

(3) Mobile Terminal 30

The mobile terminal 30 is a terminal that is a detection target detected by the detection device 10. The mobile terminal 30 is provided with a short-distance wireless communication function, and transmits/receives information related to the detection to/from the detection device 10 by using the short-distance wireless communication function.

It should be noted that the mobile terminal 30 is typically realized as a physically independent device. Besides the above, the function as the mobile terminal 30 may be implemented as an application by being loaded into a terminal device such as a smart phone, a tablet terminal, a PC, a wearable terminal, or an agent device. In other words, the mobile terminal 30 can be realized as an arbitrary terminal device.

(4) Network 14

The network 14 is a wired or wireless transmission path of information. The network 14 includes, for example, the Internet, a cellular communication network, a wireless Local Area Network (LAN), Bluetooth, a LAN, a telephone line, or the like. Information may be bi-directionally transmitted in the network 14.

It should be noted that since the detection device 10 according to the embodiment of the present disclosure is a fixed terminal, the network 14 may be a wired transmission path as an alternative to the wireless transmission path. Using a wired transmission path enables the network 14 to further stabilize a communication state of the network 14. Accordingly, the detection device 10 is capable of detecting the mobile terminal 30 more efficiently. Therefore, it is preferable that the network 14 use not a wireless transmission path but a wired transmission path.

1.2. Outline of Comparative Example

An outline of an information processing system according to a comparative example will be described below. The information processing system according to the comparative example includes a detection device, a cloud server, a mobile terminal, and a network, and has the same configuration as that of the information processing system according to an embodiment of the present disclosure. However, in the information processing system according to the embodiment of the present disclosure, the detection device is installed with an application that performs detection processing and transmission processing of a detection result, whereas in the information processing system according to the comparative example, the mobile terminal is installed with the application, which is a point of difference therebetween.

As shown in the comparative example, in a case where the mobile terminal performs detection processing, the mobile terminal always tries detection of a short-distance wireless communication signal, and is required to perform determination processing of determining whether or not the signal has been detected every time, and therefore there exists a problem that the power consumption increases. However, in the embodiment of the present disclosure, not the mobile terminal but the detection device performs determination processing. Accordingly, the mobile terminal is capable of reducing the power consumption.

In addition, since the mobile terminal is a movable terminal, there is a possibility that the mobile terminal will be moved to a place where a state of the network is unstable. As shown in the comparative example, in a case where the application of the mobile terminal performs detection processing and transmission processing of a detection result, there exists a problem that in a place where a state of the network is unstable, a delay occurs in the transmission of the detection result, or the mobile terminal is not capable of transmitting the detection result. However, in the embodiment of the present disclosure, not the mobile terminal but the application of the detection device performs detection processing and transmission processing of the detection result. In addition, since the detection device is a fixed terminal, the detection device will not be moved to the place where a state of the network is unstable. Accordingly, the detection device according to the embodiment of the present disclosure is capable of stably transmitting a detection result without being influenced by a state of the network.

In addition, in the comparative example, there is also a technique that uses Wi-Fi (registered trademark) as short-distance wireless communication standards. The technique that uses Wi-Fi is a technique for estimating, for example, a location of a terminal and the number of terminals by a detection device detecting a Wi-Fi electrical wave from a terminal such as a smart phone. However, in the case of the technique that uses Wi-Fi, there exists a problem that the power consumption of Wi-Fi is higher than the power consumption of Bluetooth. In addition, there also exists a problem that the Wi-Fi function is not always effective because of measures for suppressing the power consumption consumed by Wi-Fi. For example, there is a case where when a smart phone is brought into a sleep state, an operation system of the smart phone automatically turns off the Wi-Fi function in order to suppress the power consumption consumed by Wi-Fi. However, in the embodiment of the present disclosure, Bluetooth, the power consumption of which is lower than Wi-Fi, is used, and therefore the power consumption can be suppressed in comparison with the case where Wi-Fi is used. In addition, since the power consumption of Bluetooth is low, Bluetooth is not automatically turned off by the operation system of the smart phone, and therefore detection processing can be stably continued in comparison with the case where Wi-Fi is used.

The outline of the present disclosure has been described as above with reference to FIG. 1. Subsequently, the embodiment of the present disclosure will be described.

2. Embodiment of the Present Disclosure

The information processing system according to the embodiment of the present disclosure includes the components shown in FIG. 1 described in <1.1. Outline of information processing system>. In the information processing system, the detection device 10 performs detection processing of detecting the mobile terminal 30 and processing of transmitting a detection result to the cloud server 20. Subsequently, the cloud server 20 that has received the detection result transmits information related to a location of the user 40 who is an owner of the mobile terminal 30 to the other mobile terminal 30 corresponding to the mobile terminal 30.

2.1. Configuration Example

2.1.1. Detection Device 10

Figure 2:
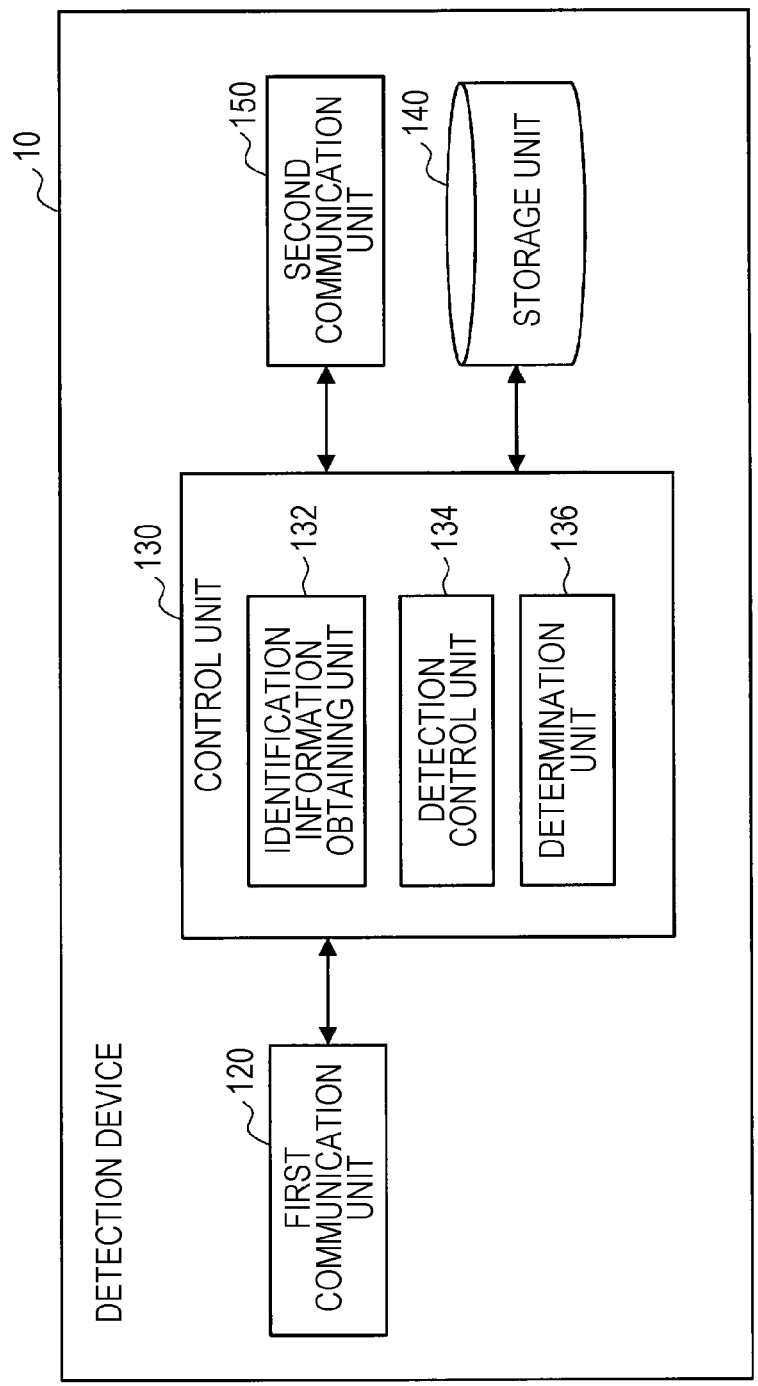
FIG. 2 is a block diagram illustrating a configuration example of a detection device according to the embodiment.

A configuration example of the detection device 10 according to the embodiment of the present disclosure will be described below with reference to FIGS. 2 to 4. As shown in FIG. 2, the detection device 10 includes a first communication unit 120, a control unit 130, a storage unit 140, and a second communication unit 150.

(1) First Communication Unit 120

The first communication unit 120 is an interface that connects the mobile terminal 30 to the detection device 10, and has a function of enabling the detection device 10 to perform information communication with the mobile terminal 30. For example, the first communication unit 120 performs information communication with the mobile terminal 30 by using a short-distance wireless communication function. In the embodiment of the present disclosure, the first communication unit 120 communicates with the mobile terminal 30 by using Bluetooth that is one of short-distance wireless communication standards. Moreover, by using Bluetooth Classic standards as Bluetooth standards, the first communication unit 120 is capable of handling more terminals provided with Bluetooth. It should be noted that short-distance wireless communication standards used by the first communication unit 120 are not limited to Bluetooth, and arbitrary short-distance wireless communication standards may be used.

In the communication with the mobile terminal 30, the first communication unit 120 obtains information used to detect the mobile terminal 30. For example, the first communication unit 120 performs pairing processing of paring with the mobile terminal 30 on the basis of an instruction from the control unit 130, and obtains identification information of the mobile terminal 30. Subsequently, the first communication unit 120 transmits the identification information to the control unit 130.

In addition, the first communication unit 120 obtains information used to detect the mobile terminal 30 by using a protocol of Bluetooth. Here, the protocol of Bluetooth will be described with reference to FIG. 3. FIG. 3 shows a protocol stack of Bluetooth. The protocol stack of Bluetooth mainly includes three blocks, which are a Host 60, a host controller interface (HCI) 70, and a Controller 80 arranged in order from an upper level layer.

Figure 3:
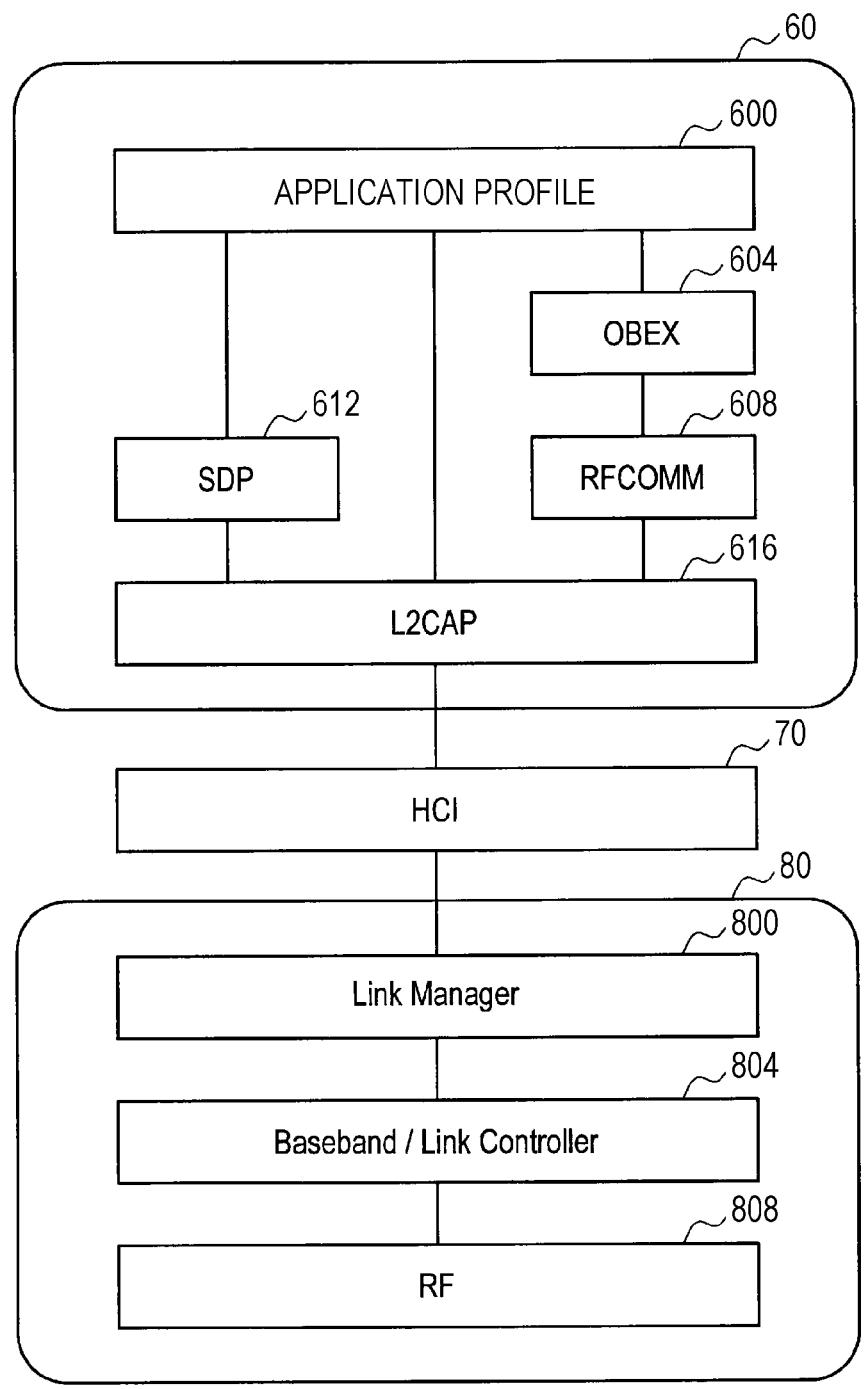
FIG. 3 is an explanatory drawing illustrating a protocol stack of Bluetooth (registered trademark) according to the embodiment.
Figure 4:
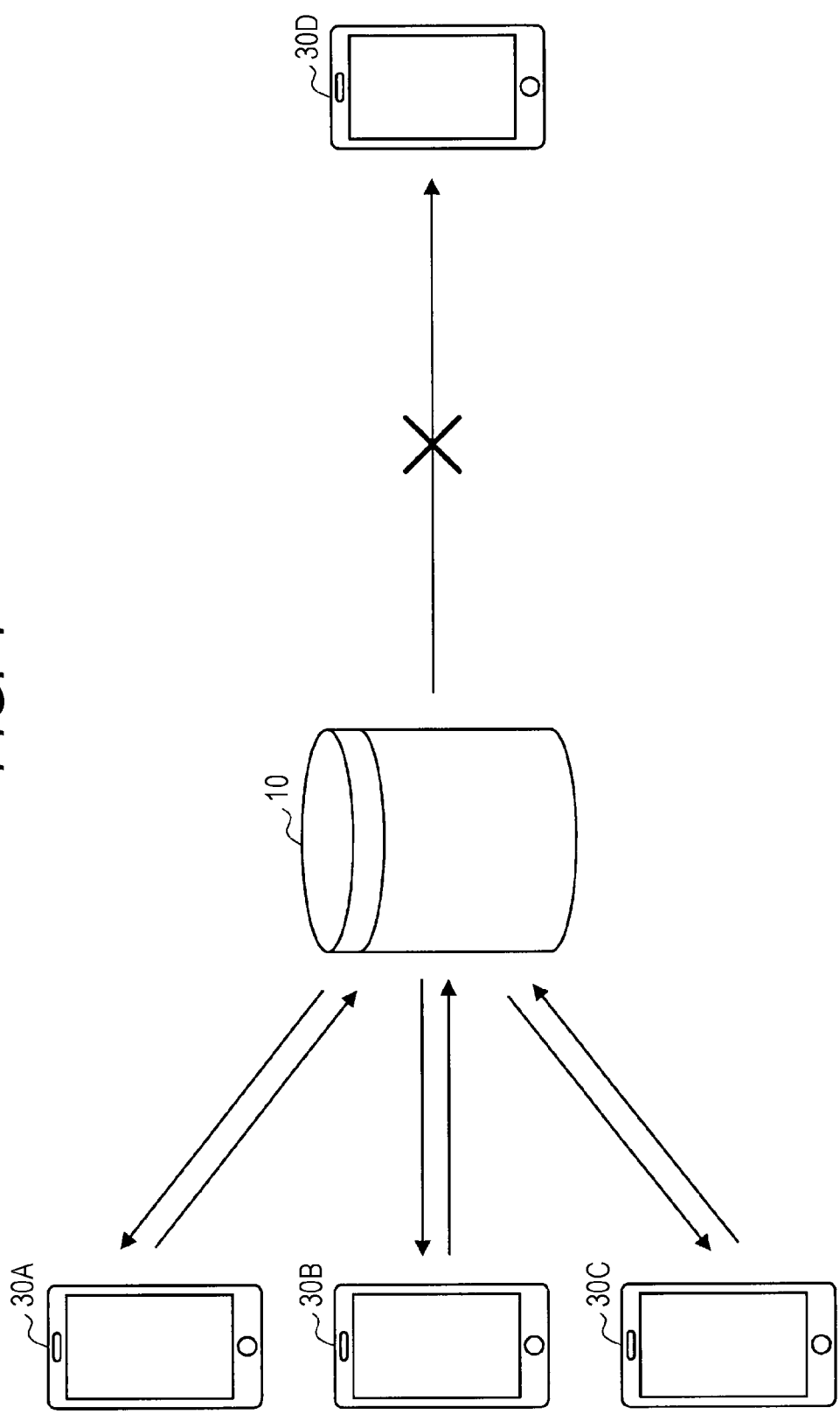
FIG. 4 is an explanatory drawing illustrating an example of detection processing of detecting a mobile terminal according to the embodiment.

As shown in FIG. 3, the Host 60 includes an application profile 600, an object exchange (OBEX) 604, a radio frequency communication (RFCOMM) 608, a service discovery protocol (SDP) 612, and a logical link control and adaptation protocol (L2CAP) 616. The application profile 600 is a protocol in which a profile is defined. The OBEX 604 is a protocol that is used when data is transmitted/received between a plurality of apparatuses. The RFCOMM 608 is a protocol used to emulate a transmission function of an RS-232C serial port on the L2CAP. The RS-232C serial port is one of serial port interface standards. The SDP 612 is a protocol used to search for a service that can be used by an apparatus connected by Bluetooth. The L2CAP 616 is a protocol used to set a data transmission path between apparatuses connected by Bluetooth.

The HCI 70 is a Bluetooth protocol that is used between the host and the controller, and as shown in FIG. 3, the HCI 70 is located between the Host 60 and the Controller 80. The HCI 70 is located in a lower layer in the protocol stack of Bluetooth, and is a protocol included in basic specifications of Bluetooth.

As shown in FIG. 3, the Controller 80 includes a Link Manager 800, a Baseband/Link Controller 804, and a radio frequency (RF) 808. The Link Manager 800 is a protocol that performs management related to link. The Baseband/Link Controller 804 is a protocol that controls encoding and decoding. The RF 808 is a protocol that relates to transmission and reception of electrical waves.

In the embodiment of the present disclosure, the first communication unit 120 uses a remote name request command included in the HCI 70 described above to obtain information used to detect the mobile terminal 30. The remote name request command is a command for obtaining a terminal name. The command causes the first communication unit 120 to cyclically transmit a request requesting a terminal name to the other mobile terminal 30 corresponding to identification information stored in the storage unit 140. The other mobile terminal 30 that has received the request transmits a terminal name to the first communication unit 120 as a response to the request. Subsequently, the first communication unit 120 transmits the terminal name to the control unit 130. In addition, the other mobile terminal 30 that has not received the request transmits nothing to the first communication unit 120, and the first communication unit 120 also transmits nothing to the control unit 130.

As described above, the first communication unit 120 performs detection processing of detecting the mobile terminal 30 by using the HCI 70 included in basic specifications of Bluetooth. Accordingly, the first communication unit 120 is basically capable of detecting the mobile terminal 30 as long as the mobile terminal 30 is provided with Bluetooth.

(2) Control Unit 130

The control unit 130 has a function of controlling operation of the detection device 10. For example, the control unit 130 performs control related to processing of detecting the mobile terminal 30 by the detection device 10. Specifically, the control unit 130 has a function of obtaining identification information of the mobile terminal 30. In addition, the control unit 130 has a function of controlling processing of detecting the mobile terminal 30. Moreover, the control unit 130 has a function of determining whether or not the detection device 10 has detected the mobile terminal 30.

Further, the control unit 130 controls transmission and reception of information between components of the detection device 10. For example, the control unit 130 receives identification information from the first communication unit 120, and transmits the identification information to the storage unit 140. In addition, the control unit 130 transmits a detection result of detecting the mobile terminal 30 to the second communication unit 150.

In order to realize the above-described functions, as shown in FIG. 3, the control unit 130 according to the embodiment of the present disclosure is provided with an identification information obtaining unit 132, a detection control unit 134, and a determination unit 136.

Identification Information Obtaining Unit 132

The identification information obtaining unit 132 has a function of obtaining identification information of a terminal that is a target of detection processing performed by the detection device 10. For example, the identification information obtaining unit 132 performs pairing between the detection device 10 and the mobile terminal 30 by a short-distance wireless communication function, thereby obtaining identification information of the mobile terminal 30, and then transmits the identification information to the storage unit 140. The identification information obtaining unit 132 executes pairing processing on the basis of the control of the cloud server 20. For example, when the identification information obtaining unit 132 receives, from the cloud server 20, an execution instruction to execute pairing processing, the identification information obtaining unit 132 instructs the first communication unit 120 to perform the pairing processing of pairing with the mobile terminal 30. Subsequently, when the pairing processing is completed, the identification information obtaining unit 132 receives identification information of the mobile terminal 30 from the first communication unit 120, and transmits the identification information to the storage unit 140.

It should be noted that a method for obtaining identification information by the identification information obtaining unit 132 is not limited to the method in which pairing is performed between the detection device 10 and the mobile terminal 30. The identification information obtaining unit 132 may obtain identification information by any method.

Detection Control Unit 134

The detection control unit 134 has a function of controlling processing of detecting the mobile terminal 30. For example, the detection control unit 134 controls processing in which the first communication unit 120 transmits a request requesting a terminal name to the mobile terminal 30. Specifically, the detection control unit 134 controls the processing in such a manner that the first communication unit 120 cyclically transmits the request to the mobile terminal 30 corresponding to the identification information stored in the storage unit 140.

In addition, the detection control unit 134 has a function of controlling a cycle in which the first communication unit 120 transmits a request. The cycle is predetermined time during which the detection device 10 performs detection processing of detecting the mobile terminal 30 (hereinafter also referred to as a "detection time period"), and the detection control unit 134 controls setting processing of setting the detection time period. It should be noted that the time period set as the detection time period is not particularly limited, and the detection control unit 134 may statically set an arbitrary time period. For example, the detection control unit 134 may statically set a detection time period according to the number of mobile terminals 30 that are detection targets detected by the detection device 10.

In addition, the detection control unit 134 may dynamically set an arbitrary detection time period. For example, the detection control unit 134 may dynamically set a detection time period according to the detection result of detecting the mobile terminal 30. Since the detection device 10 according to the present embodiment is a device that detects the mobile terminal 30, it is more important for the detection device 10 to detect the mobile terminal 30 that has not yet been detected than to repeatedly detect the mobile terminal 30 that has been detected once. Accordingly, the detection control unit 134 may perform detection processing with the priority of the mobile terminal 30 that has been detected once decreased, and with the priority of the mobile terminal 30 that has not yet been detected increased. Accordingly, in a case where the mobile terminal 30 has been detected, the detection control unit 134 may set a detection time period during which detection processing is performed for the above-described mobile terminal 30 to be short. Meanwhile, in a case where the mobile terminal 30 has not been detected, the detection control unit 134 may set a detection time period during which detection processing is performed for the above-described mobile terminal 30 to be long.

Determination Unit 136

The determination unit 136 has a function of determining whether or not the detection device 10 has detected the mobile terminal 30. For example, on the basis of whether or not a response to a request transmitted to the mobile terminal 30 by the first communication unit 120 has been received from the mobile terminal 30 after the transmission of the request until the detection time period elapses, the determination unit 136 determines whether or not the detection device 10 has detected the mobile terminal 30. Specifically, in a case where a response of the mobile terminal 30 has been received within the detection time period after the transmission of the request, in other words, in a case where a terminal name of the mobile terminal 30 has been received from the first communication unit 120, the determination unit 136 determines that the detection device 10 has detected the mobile terminal 30. In addition, in a case where a response of the mobile terminal 30 has not been received within the detection time period after the transmission of the request, in other words, in a case where a terminal name of the mobile terminal 30 has not been received from the first communication unit 120, the determination unit 136 determines that the detection device 10 has not detected the mobile terminal 30.

In addition, the determination unit 136 has a function of transmitting a detection result based on the determination result to the second communication unit 150. For example, in a case where it has been determined that the detection device 10 has detected the mobile terminal 30, the determination unit 136 transmits, to the second communication unit 150, the detection result indicating that the mobile terminal 30 has been detected. In addition, in a case where it has been determined that the detection device 10 has not detected the mobile terminal 30, the determination unit 136 transmits, to the second communication unit 150, the detection result indicating that the mobile terminal 30 has not been detected.

It should be noted that the timing when the determination unit 136 transmits a detection result to the second communication unit 150 is not particularly limited, and the determination unit 136 may transmit the detection result at arbitrary timing. For example, the determination unit 136 may transmit a detection result to the second communication unit 150 every time determination processing is performed. Moreover, for example, after the determination unit 136 has performed determination processing a plurality of times, the determination unit 136 may collectively transmit detection results of detections performed a plurality of times to the second communication unit 150. Further, for example, when a detection result has changed, the determination unit 136 may transmit the detection result to the second communication unit 150. Specifically, in a case where the detection result obtained last time is "not detected", and the detection result obtained this time is also "not detected", the determination unit 136 does not transmit the detection result to the second communication unit 150. The same applies to a case where the mobile terminal 30 has been detected in both detection processing last time and detection processing this time. Furthermore, in a case where the detection result obtained last time is "not detected", and the mobile terminal 30 has been detected by detection processing this time, the determination unit 136 transmits the detection result to the second communication unit 150. The same applies to a case where the detection result obtained this time is the reverse of the detection result obtained last time.

Here, processing of detecting the mobile terminal 30 by the detection device 10 will be specifically described with reference to FIG. 4. In FIG. 4, the detection device 10 tries detection of the mobile terminal 30A, the mobile terminal 30B, a mobile terminal 30C, and a mobile terminal 30D. It should be noted that identification information of each of the mobile terminals 30 is stored in the storage unit 140 of the detection device 10, and the detection device 10 cyclically transmits a request to each of the mobile terminals 30 on the basis of the identification information. For example, as shown in FIG. 4, the detection device 10 transmits a request to the mobile terminal 30A, and receives a response from the mobile terminal 30A. Accordingly, the determination unit 136 of the detection device 10 determines that the mobile terminal 30A has been detected. Similarly, the detection device 10 also transmits requests to the mobile terminal 30B and the mobile terminal 30C, and receives responses therefrom, respectively, and therefore the detection device 10 determines that the mobile terminal 30B and the mobile terminal 30C have also been detected. However, although the detection device 10 also transmits a request to the mobile terminal 30D, the mobile terminal 30D does not transmit a response to the request. This is because the mobile terminal 30D exists outside a request transmission range of the detection device 10, and the mobile terminal 30D has not received the result that the request from the mobile terminal 30A. Accordingly, the determination unit 136 of the detection device 10 determines that the mobile terminal 30D has not been detected.

It should be noted that the request transmission range indicates a range within which a request transmitted from the detection device 10 reaches. The request transmission range is extended/reduced depending on wireless communication standards used for transmission of a request, transmission power, a degree of interference, and the like.

(3) Storage Unit 140

The storage unit 140 has a function of storing information received from the control unit 130. For example, the storage unit 140 stores identification information of the mobile terminal 30 received from the control unit 130. In the present embodiment, the storage unit 140 stores a Bluetooth Device address (BD address) as identification information. The BD address is a 48-bit address expressed by a binary number of 0 or 1, is separated by a hyphen, colon, or the like every eight bits, and is represented after being converted into a hexadecimal number. For example, the BD address is expressed as "01-2A-34-BC-D5-67". It should be noted that a BD address format used when the storage unit 140 stores a BD address is not particularly limited, and thus the BD address may be stored in any format. In addition, identification information shown in the undermentioned table 1 is expressed in a four-digit number for simplification.

In addition, when the storage unit 140 receives a detection result of detecting the mobile terminal 30 from the determination unit 136, the storage unit 140 may store the detection result by associating the detection result with identification information corresponding to the mobile terminal 30. By storing detection results in the storage unit 140, the determination unit 136 is capable of comparing the detection result obtained this time with the detection result obtained last time. For example, as shown in the following table 1, the storage unit 140 stores detection results.

TABLE 1

Example in which detection results are stored in storage unit 140

| Identification information | Detection result | Date and time |
|---|---|---|
| 1111 | Not detected | 20171205102520 |
| 2222 | Not detected | 20171205102550 |
| 3333 | Detected | 20171205102620 |

It should be noted that although table 1 shows an example in which the storage unit 140 stores only the detection result obtained last time, the storage unit 140 may store a detection result received before the last time.

(4) Second Communication Unit 150

The second communication unit 150 is an interface that connects the cloud server 20 to the detection device 10, and has a function of enabling the detection device 10 to perform information communication with the cloud server 20. For example, in communicating with the cloud server 20, the second communication unit 150 transmits, to the cloud server 20, a detection result of detecting the mobile terminal 30 received from the control unit 130. In addition, in communicating with the cloud server 20, the second communication unit 150 receives, from the cloud server 20, an execution instruction to execute pairing, and transmits the execution instruction to the control unit 130.

It should be noted that the timing at which the second communication unit 150 transmits a detection result of detecting the mobile terminal 30 to the cloud server 20 is not particularly limited, and accordingly the second communication unit 150 may transmit the detection result of detecting the mobile terminal 30 to the cloud server 20 at arbitrary timing. For example, when a detection result of detecting the mobile terminal 30 has changed, the second communication unit 150 may receive the detection result from the control unit 130 to transmit the detection result to the cloud server 20.

The configuration example of the detection device 10 according to the embodiment of the present disclosure has been described above with reference to FIGS. 2 to 4. Subsequently, a configuration example of the cloud server 20 according to the embodiment of the present disclosure will be described.

(2.1.2. Cloud Server 20)

Figure 5:
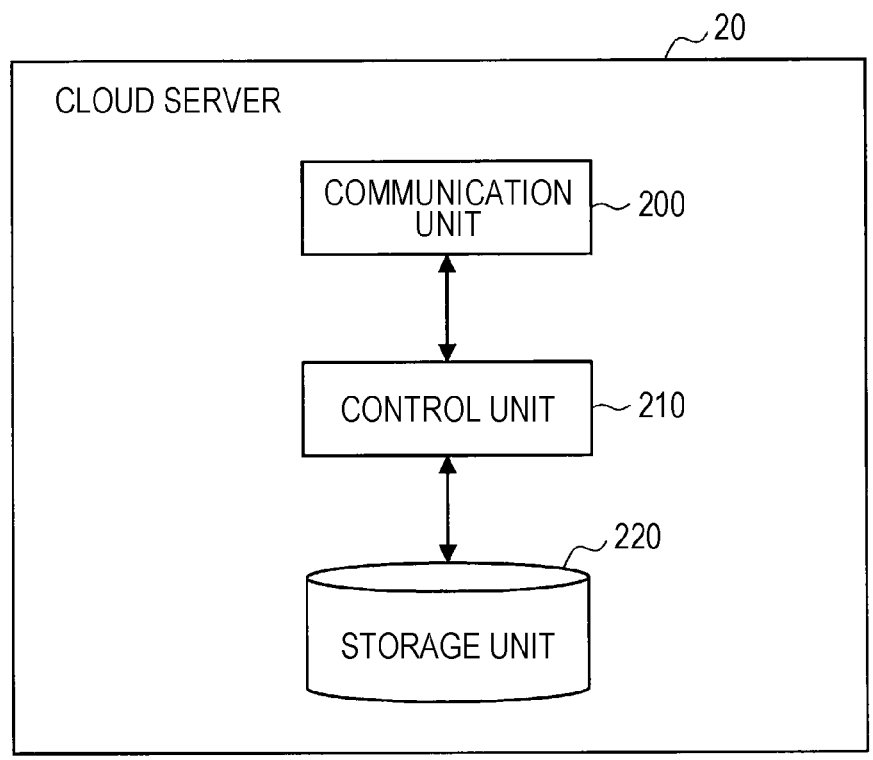
FIG. 5 is a block diagram illustrating a configuration example of a cloud server according to the embodiment.

A configuration example of the cloud server 20 according to the embodiment of the present disclosure will be described below with reference to FIG. 5. As shown in FIG. 5, the cloud server 20 includes a communication unit 200, a control unit 210, and a storage unit 220.

(1) Communication Unit 200

The communication unit 200 is an interface that connects the detection device 10 to the cloud server 20, and has a function of enabling the cloud server 20 to perform information communication with the detection device 10. For example, in communicating with the detection device 10, the communication unit 200 transmits an execution instruction to execute pairing to the detection device 10. In addition, in communicating with the detection device 10, the communication unit 200 receives a detection result of detecting the mobile terminal 30A. Moreover, on the basis of the detection result, the communication unit 200 transmits, to the mobile terminal 30B, information related to a location of the user 40A who is an owner of the mobile terminal 30A.

(2) Control Unit 210

The control unit 210 has a function of determining a location of a user. For example, the control unit 210 determines the location of the user on the basis of a detection result received from the communication unit 200. Specifically, in a case where the detection result indicates that the mobile terminal 30 has been detected, on the assumption that the user 40 exists near the mobile terminal 30, the control unit 210 determines a place where the detection device 10 that has detected the mobile terminal 30 is installed to be the location of the user 40. In addition, in a case where the detection result indicates that the mobile terminal 30 has not been detected, the control unit 210 determines that the user 40 does not exist in a place where the detection device 10 that has performed detection processing for the mobile terminal 30 is installed.

Moreover, the control unit 210 causes the communication unit 200 to transmit information related to the location of the user 40 to the mobile terminal 30 of the other user 40 associated with the above-described user 40. For example, the control unit 210 causes the communication unit 200 to transmit, to the mobile terminal 30 of the other user 40, information indicating that the user 40 exists in the above-described location. Further, the control unit 210 causes the communication unit 200 to transmit, to the mobile terminal 30 of the other user 40, information indicating that the user 40 does not exist in the above-described location.

(3) Storage Unit 220

The storage unit 220 has a function of storing information obtained from the detection device 10, and information that is associated with the information. For example, the storage unit 220 stores the mobile terminal 30, the user 40 of the mobile terminal 30, and the mobile terminal 30 of the other user 40 associated with the user 40 of the mobile terminal 30 by associating them with one another. Specifically, as shown in the undermentioned table 2, the storage unit 220 stores identification information, user name, and related identification information. The identification information, the user name, and the related identification information are stored by being associated with one another. The user name is a name indicating the user 40 who owns the mobile terminal 30. The related identification information is identification information of the mobile terminal 30 owned by the other user 40 associated with the user 40. By setting the related identification information, the cloud server 20 is capable of transmitting a detection result of detecting the other mobile terminal 30 to the mobile terminal 30 corresponding to the set identification information. It should be noted that the identification information and the related identification information shown in the following table 2 are expressed in four-digit numbers for simplification.

TABLE 2

Example in which identification information, user name, and related identification information are stored in storage unit 220

| Identification information | User name | Related identification information |
|---|---|---|
| 1111 | User 40A | 2222 |
|  |  | 3333 |
| 2222 | User 40B | 1111 |
|  |  | 3333 |
| 3333 | User 40C | 2222 |

For example, as shown in table 2, the mobile terminal 30, the identification information of which is "1111", has a user name of "user 40A", and identification information of terminals associated therewith is "2222" and "3333". Accordingly, in a case where the detection device 10 has detected the mobile terminal 30, the cloud server 20 notifies the mobile terminals 30 of the user 40B and the user 40C that the user 40A is at home.

In addition, as shown in, for example, table 2, the mobile terminal 30, the identification information of which is "2222", has a user name of "user 40B", and identification information of terminals associated therewith is "1111" and "3333". Accordingly, in a case where the detection device 10 has not detected the mobile terminal 30, the cloud server 20 notifies the mobile terminals 30 of the user 40A and the user 40C that the user 40B is absent.

In addition, for example, the mobile terminal 30, the identification information of which is "3333", has a user name of "user 40C", and identification information of a terminal associated therewith is only "2222". Accordingly, in a case where the detection device 10 has detected the mobile terminal 30, the cloud server 20 notifies only the mobile terminal 30 of the user 40B that the user 40C is at home.

Moreover, the storage unit 220 also has a function of storing a detection result of detecting the mobile terminal 30. For example, the storage unit 220 stores the mobile terminal 30 and a detection result of detecting the mobile terminal 30 with the mobile terminal 30 associated with the detection result. Specifically, as shown in the undermentioned table 3, the storage unit 220 stores detection device, identification information, detection result, and date and time. By storing past detection results in the storage unit 220, the cloud server 20 is capable of providing the user 40 or the other user 40 with information related to the past location of the user 40. It should be noted that identification information shown in the following table 3 is expressed in a four-digit number for simplification.

TABLE 3

Example in which detection results are stored in storage unit 220

| Storage device | Identification information | Detection result | Date and time |
|---|---|---|---|
| Storage device 10A | 1111 | Not detected | 20171205102520 |
|  |  | . . . | . . . |
|  |  | Detected | 20171205101530 |
|  | 2222 | Not detected | 20171205102550 |
|  |  | . . . | . . . |
|  |  | Not detected | 20171205101600 |
| Storage device 10B | 1111 | Detected | 20171205102520 |
|  |  | . . . | . . . |
|  |  | Not detected | 20171205101530 |
|  | 2222 | Detected | 20171205102550 |
|  |  | . . . | . . . |
|  |  | Detected | 20171205101600 |

The configuration example of the cloud server 20 according to the embodiment of the present disclosure has been described above with reference to FIG. 5. Subsequently, an operation example of the information processing system according to the embodiment of the present disclosure will be described.

2.2. Operation Example 2.2.1. Operation Example of Detection Device 10 in One Cycle of Detection Processing First of all, an operation example of the detection device 10 in one cycle of detection processing will be described. In the embodiment of the present disclosure, the detection device 10 performs detection processing of detecting the mobile terminal 30 according to a preset cycle. Specifically, within a one-cycle time set beforehand by the detection control unit 134, the detection device 10 transmits a request, and after transmitting the request, performs detection determination processing for a detection time period. An example in which detection processing is performed for one mobile terminal 30 in one cycle will be more specifically described below. For example, in a case where the detection control unit 134 sets one-cycle time at 30 seconds, and also sets a detection time period at 30 seconds, the determination unit 136 of the detection device 10 performs detection processing after the first communication unit 120 transmits a request to one mobile terminal 30 until 30 seconds elapses. After the lapse of 30 seconds, the determination unit 136 of the detection device 10 causes the second communication unit 150 to transmit a detection result to the cloud server 20 irrespective of whether or not the mobile terminal 30 has been detected. Subsequently, the first communication unit 120 of the detection device 10 transmits a request to the same mobile terminal 30 again, and the determination unit 136 repeats detection processing for the next cycle in a manner similar to that of the above-described detection processing. It should be noted that the detection control unit 134 may set, in a one-cycle time, a time during which the detection device 10 is kept in a sleep state. For example, in a case where the detection control unit 134 sets one-cycle time at 30 seconds, and sets a detection time period at 10 seconds, remaining 20 seconds are the time during which the detection device 10 is kept in a sleep state.

In addition, in the above example, the first communication unit 120 transmits a request to one mobile terminal 30 in one cycle. However, the number of mobile terminals 30 to which a request is transmitted in one cycle is not particularly limited. The first communication unit 120 may concurrently transmit a request to a plurality of mobile terminals 30. For example, when the detection device 10 performs detection processing for two mobile terminals 30, in a case where the detection control unit 134 sets one-cycle time at 30 seconds, the detection control unit 134 may set a detection time period for each mobile terminal 30 at 15 seconds. As processing of the detection device 10, the first communication unit 120 transmits a request to the first mobile terminal 30, and after the lapse of the detection time period, the second communication unit 150 transmits a detection result to the cloud server 20, and subsequently the first communication unit 120 transmits a request to the second mobile terminal 30. After the lapse of the detection time period for the second mobile terminal 30, the second communication unit 150 transmits a detection result to the cloud server 20. Subsequently, the first communication unit 120 transmits a request to the first mobile terminal 30 again, and thereby the detection device 10 repeats the above-described processing.

In addition, in the above example, the detection device 10 performs detection processing of detecting the mobile terminal 30 one by one in order by single thread according to the preset cycle. However, the detection device 10 may concurrently perform detection processing of detecting the plurality of mobile terminals 30 by multithread. By concurrently performing detection processing for the plurality of mobile terminals 30, the detection device 10 is capable of detecting the mobile terminals 30 more efficiently in comparison with the case where detection processing of detecting the mobile terminal 30 is performed one by one.

Figure 6:
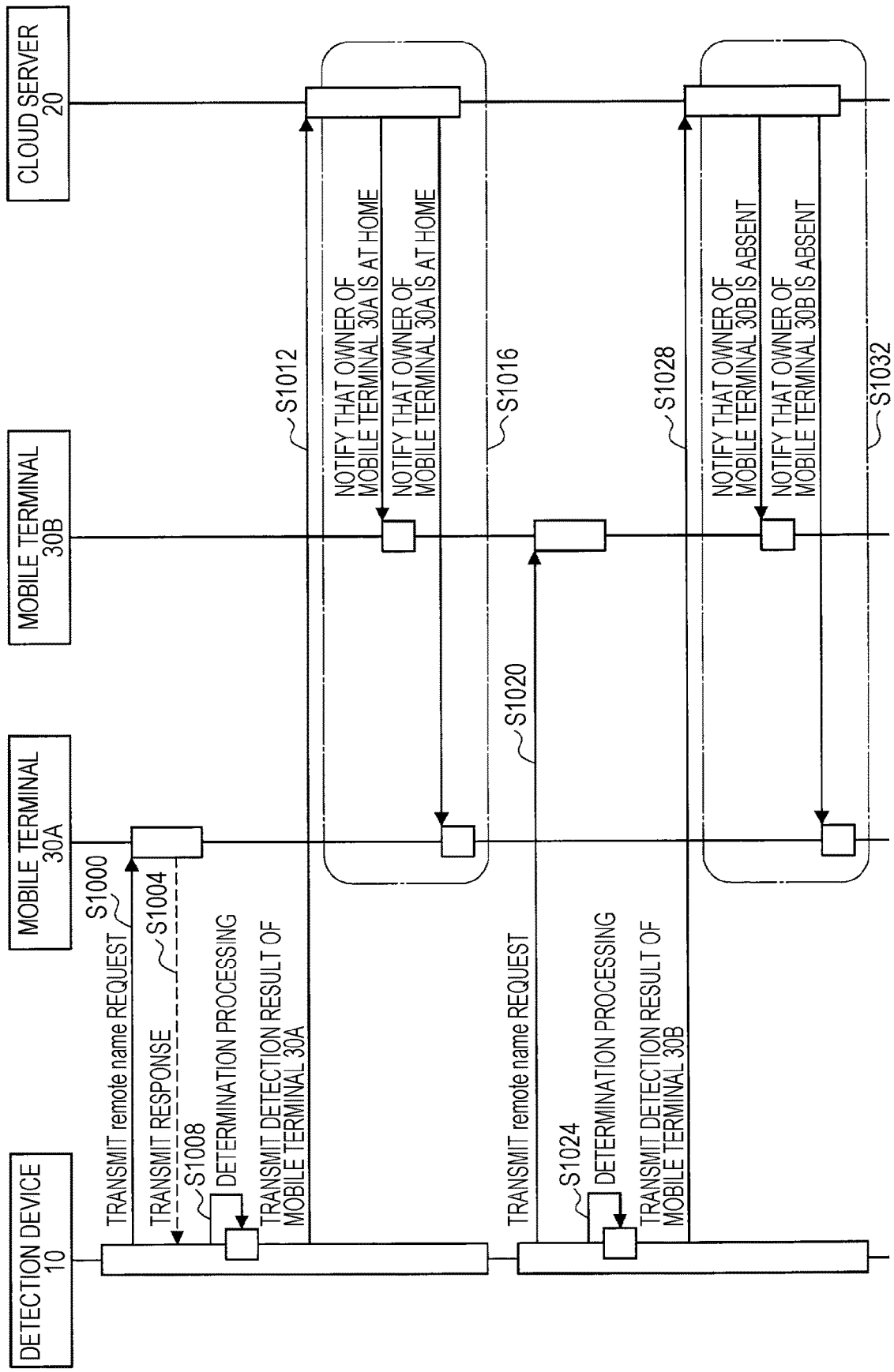
FIG. 6 is a sequence diagram illustrating an operation example of the information processing system according to the embodiment.
Figure 7:
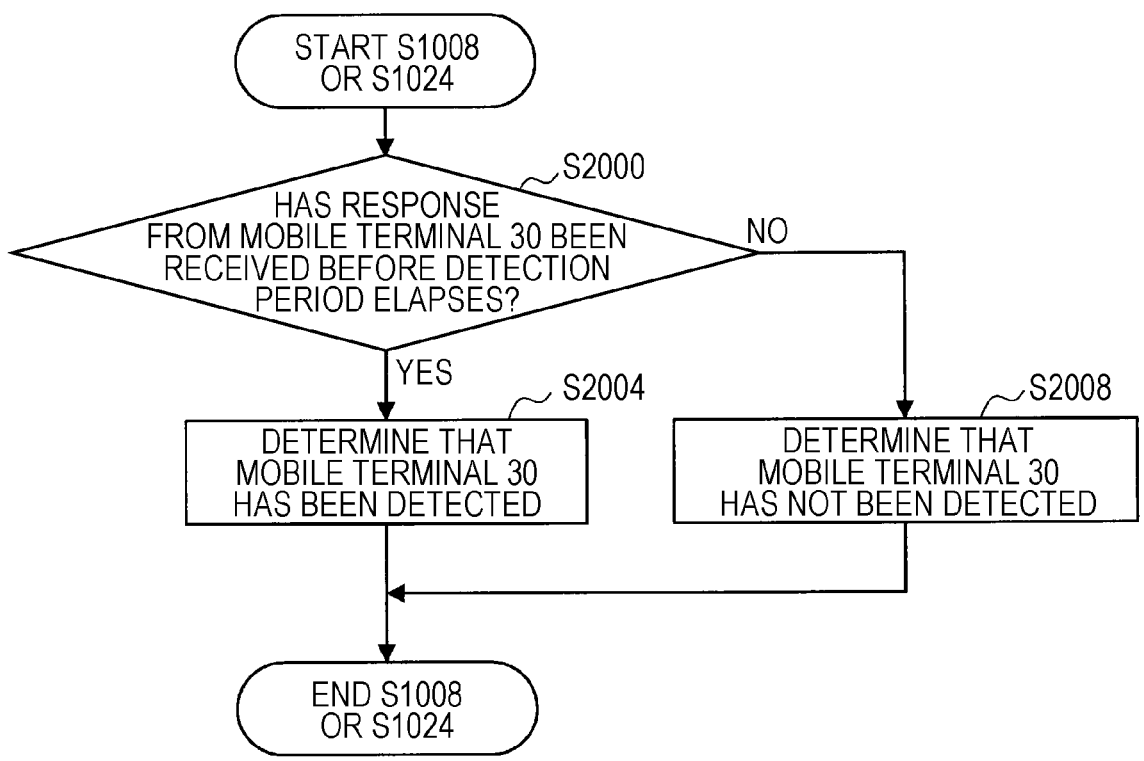
FIG. 7 is a flowchart illustrating an example of determination processing according to the embodiment.

The operation example of the detection device 10 in one cycle of detection processing has been described above. Subsequently, an operation example of the information processing system according to the embodiment of the present disclosure will be described below with reference to FIGS. 6 and 7. FIG. 6 is a sequence diagram illustrating an operation example of the information processing system according to the embodiment of the present disclosure. FIG. 7 is a flowchart illustrating an example of determination processing according to the embodiment of the present disclosure.

(2.2.2. A Case where Detection Device 10 has Detected Mobile Terminal 30)

A case where the detection device 10 performs detection processing for the mobile terminal 30A will be described below. Incidentally, it is assumed that the mobile terminal 30A exists within a request transmission range of the detection device 10.

As shown in FIG. 6, the detection device 10 transmits a remote name request to the mobile terminal 30A by using a remote name request command of the HCI protocol of Bluetooth (step S1000). The mobile terminal 30A that has received the request from the detection device 10 transmits its own terminal name to the detection device 10 (step S1004). On the basis of whether or not the terminal name has been received from the mobile terminal 30A, the detection device 10 performs determination processing of determining whether or not the mobile terminal 30A has been detected (step S1008).

Here, determination processing in the step S1008 will be specifically described with reference to FIG. 7. FIG. 7 is a flowchart illustrating an example of determination processing according to the embodiment of the present disclosure. As shown in FIG. 7, first of all, the determination unit 136 checks whether or not a response has been received from the mobile terminal 30A after the transmission of the request until the detection time period elapses (step S2000). In a case where a response has been received from the mobile terminal 30A until the detection time period elapses (step S2000/YES), the determination unit 136 determines that the mobile terminal 30A has been detected (step S2004). In a case where a response has not been received from the mobile terminal 30A until the detection time period elapses (step S2000/NO), the determination unit 136 determines that the mobile terminal 30A has not been detected (step S2008).

Since the terminal name has been received from the mobile terminal 30A in the step S1004, the detection device 10 determines that the mobile terminal 30A has been detected, and transmits, to the cloud server 20, a detection result indicating that the mobile terminal 30A has been detected (step S1012). Since the detection device 10 has detected the mobile terminal 30A, the cloud server 20 that has received the detection result notifies, all at once, the other mobile terminals, which are associated with the mobile terminal 30A, that an owner of the mobile terminal 30A is at home (step S1016). It should be noted that in the example shown in FIG. 6, the cloud server 20 also notifies the mobile terminal 30A, which is a detection target, that the owner of the mobile terminal 30A is at home. However, the cloud server 20 is not always required to notify the mobile terminal 30A, which is a detection target, that the owner of the mobile terminal 30A is at home.

(2.2.3. A Case where Detection Device 10 has not Detected Mobile Terminal 30)

A case where the detection device 10 performs detection processing for the mobile terminal 30B will be described below. Incidentally, it is assumed that the mobile terminal 30B exists outside the request transmission range of the detection device 10.

As shown in FIG. 6, the detection device 10 transmits a remote name request to the mobile terminal 30B by using a remote name request command of the HCI protocol of Bluetooth (step S1020). The mobile terminal 30B exists outside the request transmission range of the detection device 10, and consequently is not capable of receiving a request from the detection device 10. Therefore, the mobile terminal 30B does not transmit its own terminal name to the detection device 10. After transmitting the request and the lapse of the detection time period, the detection device 10 performs determination processing of determining whether or not a terminal name has been received (step S1024).

It should be noted that the determination processing in the step S1024 is identical to the determination processing in the step S1008 described in (2.2.2. A case where detection device 10 has detected mobile terminal 30), and therefore detailed description thereof will be omitted.

Since a response to the request has not been received from the mobile terminal 30B after the transmission of the request, the detection device 10 determines that the mobile terminal 30B has not been detected, and transmits, to the cloud server 20, a detection result indicating that the mobile terminal 30B has not been detected (step S1028). Since the detection device 10 has not detected the mobile terminal 30B, the cloud server 20 that has received the detection result notifies, all at once, the other mobile terminals, which are associated with the mobile terminal 30B, that the owner of the mobile terminal 30B is absent (step S1032). It should be noted that in the example shown in FIG. 6, the cloud server 20 also notifies the mobile terminal 30B, which is the detection target, that the owner of the mobile terminal 30B is absent. However, the cloud server 20 is not always required to notify the mobile terminal 30B, which is the detection target, that the owner of the mobile terminal 30B is absent.

The operation example of the information processing system according to the embodiment of the present disclosure has been described above with reference to FIGS. 6 and 7.

The information processing system according to the embodiment of the present disclosure has been described above with reference to FIGS. 2 to 7. Subsequently, modified examples according to one embodiment of the present disclosure will be described.

3. Modified Examples

Modified examples of one embodiment of the present disclosure will be described below. It should be noted that modified examples described below may be independently applied to the embodiment of the present disclosure, or may be applied to the embodiment of the present disclosure in combination. In addition, the modified examples may be applied as an alternative to the configuration described in the embodiment of the present disclosure, or may be additionally applied to the configuration described in the embodiment of the present disclosure.

3.1. First Modified Example

Although the above embodiment has described the example in which one detection device 10 is installed in the house 50, the plurality of detection devices 10 may be installed in the house 50. An example in which each room in the house 50 has one or a plurality of detection devices 10 installed therein will be described below. For example, in a case where each room of the house 50 has one detection device 10 installed therein, a request is transmitted from the detection device 10 of each room. In addition, by comparing the time taken by the mobile terminal 30 to respond to each request, each of the detection devices 10 is capable of identifying, a room in which the mobile terminal 30 exists, which room the mobile terminal 30 exists near, or the like. It should be noted that the processing of identifying a location of the mobile terminal 30 on the basis of the response result of responding to the request may be performed not by the detection device 10 but by the cloud server 20. For example, the cloud server 20 receives information related to the time taken by the mobile terminal 30 to respond to the request from the detection device 10 from the plurality of detection devices 10 as response results to compare the plurality of response results, and thereby identifies a location of the mobile terminal 30. Subsequently, on the basis of the identified location of the mobile terminal 30, the cloud server 20 may transmit location information of the user 40, who is the owner of the mobile terminal 30, to the other mobile terminals 30 that are associated with the mobile terminal 30.

In addition, in a case where the plurality of detection devices 10 is installed, each detection device 10 may be individually assigned to take charge of the mobile terminal 30 to which each detection device 10 transmits a request. For example, the detection device 10 may transmit a request to the mobile terminal 30 other than the mobile terminals 30 to which the other detection devices 10 transmit requests. Specifically, first of all, each detection device 10 sets the mobile terminal 30 to which each detection device 10 transmits a request. Subsequently, the first communication unit 120 of the detection device 10 transmits a request to the mobile terminal 30 that has been set as a destination of the transmitted request, among the plurality of mobile terminals 30 corresponding to identification information stored in the storage unit 140 of the detection device 10. In addition, the first communication unit 120 of the detection device 10 does not transmit a request to the mobile terminals 30 to which requests are transmitted by the other detection devices 10, among the plurality of mobile terminals 30 corresponding to identification information stored in the storage unit 140 of the detection device 10.

Moreover, each of the plurality of detection devices 10 may be assigned to take charge of the mobile terminal 30 to which each of the detection devices 10 transmits a request according to the time after the detection device 10 transmits a request until the mobile terminal 30 responds to the request. For example, the detection device 10 is adapted to transmit a request to the mobile terminal 30 in which the time after the detection device 10 transmits a request until a response is received is shorter than the time after the other detection devices 10 transmit a request until a response is received. Specifically, the detection device 10 in which the time after the first communication unit 120 transmits a request to the mobile terminal 30 until a response from the mobile terminal 30 is received is the shortest among the plurality of detection devices 10 may be assigned to take charge of transmitting a request to the mobile terminal 30.

As described above, by installing the plurality of detection devices 10, each of the detection devices 10 can be assigned to take charge of detecting each of the mobile terminals 30 on the basis of the detection result of detecting the mobile terminal 30, and consequently the processing can be distributed. Accordingly, the detection device 10 is capable of detecting the mobile terminal 30 more efficiently.

3.2. Second Modified Example

The first modified example has described the example in which each room may have one or a plurality of detection devices 10 installed therein. However, an example in which the detection devices 10, the number of which corresponds to the number of mobile terminals 30, may be installed in the house 50 will be described below. Since the plurality of detection devices 10 exists, the number of mobile terminals 30 that are detection targets detected by one detection device 10 can be reduced. For example, the detection devices 10, the number of which is equivalent to the number of mobile terminals 30 that are targets to be detected, may be installed. Since the number of detection devices 10 that exist is the same as the number of mobile terminals 30 that exist, the user 40 can make a one-to-one association of the detection device 10 with the mobile terminal 30, and consequently the number of mobile terminals 30 that are targets to be detected by each detection device 10 can be narrowed down into one.

As described above, by installing the plurality of detection devices 10, the number of mobile terminals 30 that are targets to be detected by one detection device 10 decreases, and consequently the detection device 10 is capable of shortening the cycle time until detection processing is performed again for a certain mobile terminal 30. Accordingly, the detection device 10 is capable of detecting the mobile terminal 30 more efficiently.

The modified examples according to the embodiment of the present disclosure have been described above. Subsequently, application examples of the information processing system according to the embodiment of the present disclosure will be described.

4. Application Examples

Application examples of the information processing system according to the embodiment of the present disclosure will be described below.

4.1. First Application Example

An example in which the information processing system according to the embodiment of the present disclosure is applied to management of attendance or management of attendance and leaving will be described below. For example, in a case where the detection device 10 is installed in a school, a teacher can manage attendance of students by detecting the mobile terminals 30 owned by the students by using the detection device 10. Similarly, for example, in a case where the detection device 10 is installed in an office, a manager of the office can manage attendance and leaving of staff members.

4.2. Second Application Example

An example in which the information processing system according to the embodiment of the present disclosure is applied to management of equipment rental will be described below. For example, by provided equipment to be managed with a Bluetooth chip, the detection device 10 that is installed in a storage area is capable of detecting the equipment. In addition, on the basis of whether or not the detection device 10 has detected the equipment, the user 40 can manage whether or not the equipment is being lent out.

4.3. Third Application Example

An example in which the information processing system according to the embodiment of the present disclosure is applied to management of going in and out of persons will be described below. For example, in a case where the detection device 10 is installed at a ticket gate of a station, a manager of a railroad company can manage going in and out of users who use the station through the ticket gate by detecting the mobile terminals 30 owned by the users by using the detection device 10. Similarly, for example, in a case where the detection device 10 is installed at an exit and entrance of a commercial facility, a manager of the commercial facility can manage going in and out of users.

The application examples of the information processing system according to the embodiment of the present disclosure have been described above. Subsequently, a hardware configuration according to one embodiment of the present disclosure will be described.

5. Hardware Configuration

Figure 8:
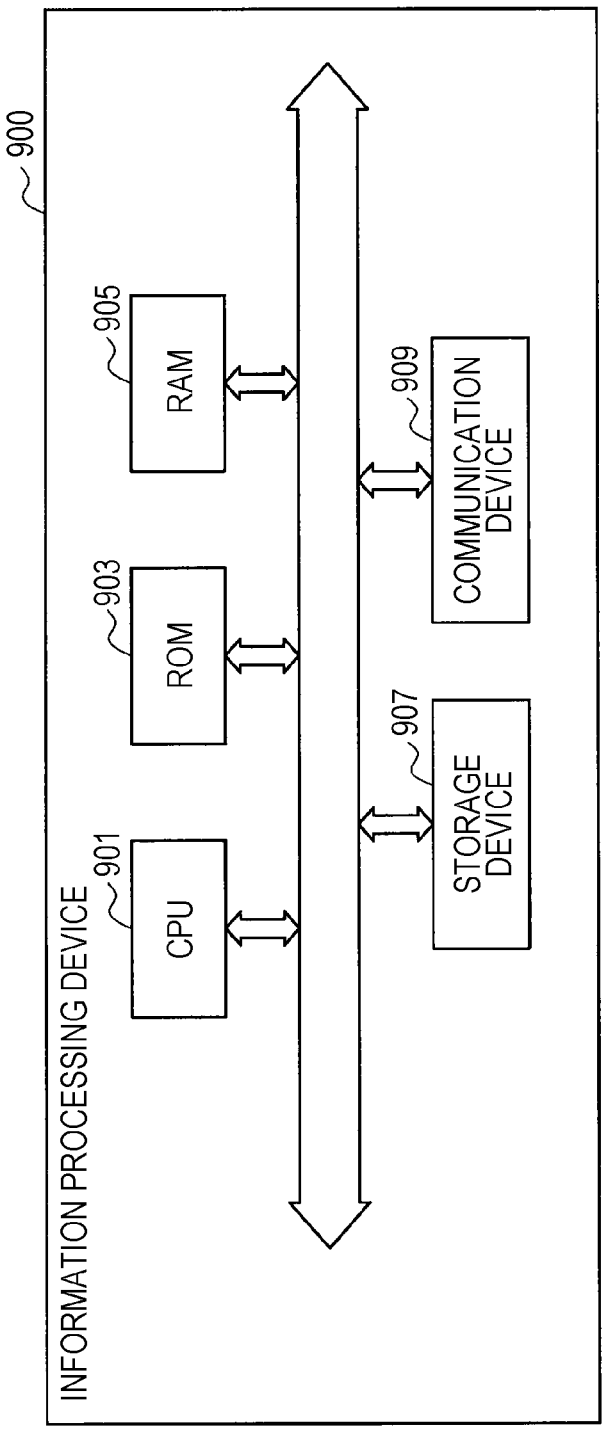
FIG. 8 is a block diagram illustrating an exemplary hardware configuration of the information processing device according to the embodiment.

Lastly, a hardware configuration of the information processing device according to the present embodiment will be described with reference to FIG. 8. FIG. 8 is a block diagram illustrating an example of a hardware configuration of the information processing device according to the present embodiment. It should be noted that an information processing device 900 shown in FIG. 8 is capable of realizing the detection device 10 or the cloud server 20 shown in, for example, FIGS. 2 and 5 respectively. Information processing performed by the detection device 10 or the cloud server 20 according to the present embodiment is realized by collaboration between software and undermentioned hardware.

FIG. 8 is a block diagram illustrating a hardware configuration of the information processing device 900. The information processing device 900 is provided with a central processing unit (CPU) 901, a read only memory (ROM) 903, and a random access memory (RAM) 905. In addition, the information processing device 900 is provided with a storage device 907 and a communication device 909.

The CPU 901 functions as a computation processing device and a control device, and controls the overall operation in the information processing device 900 according to various kinds of programs. In addition, the CPU 901 may be a microprocessor. The ROM 903 stores programs, computation parameters, and the like used by the CPU 901. The RAM 905 temporarily stores, for example, programs used for execution of the CPU 901, parameters that change as appropriate during the execution thereof, and the like. These components are mutually connected through a host bus that includes a CPU bus and the like. The CPU 901, the ROM 903, and the RAM 905 are capable of realizing the functions of the identification information obtaining unit 132, the detection control unit 134, and the determination unit 136 that have been described with reference to, for example, FIG. 2. In addition, the CPU 901, the ROM 903, and the RAM 905 are capable of realizing the function of the control unit 210 described with reference to, for example, FIG. 5.

The storage device 907 is a device for storing data. The storage device 907 may include a storage medium, a recording device for recording data on the storage medium, a readout device for reading data from the storage medium, a deletion device for deleting data recorded on the storage medium, and the like. The storage device 907 includes, for example, a hard disk drive (HDD), or a solid storage drive (SSD), a memory having an equivalent function, or the like. This storage device 907 drives a storage, and stores programs executed by the CPU 901, and various data. The storage device 907 is capable of realizing the function of the storage unit 140 described with reference to, for example, FIG. 2. In addition, the storage device 907 is capable of realizing the function of the storage unit 220 described with reference to, for example, FIG. 5.

The communication device 909 is a communication interface that includes a communication device and the like for connecting to, for example, the network 14. Such a communication interface is, for example, a short-distance wireless communication interface such as Bluetooth or ZigBee (registered trademark), or is a communication interface such as a wireless local area network (LAN), Wi-Fi, or a mobile phone communication network (LTE, 3G). In addition, the communication device 909 may be a wired communication device that performs wired communication. The communication device 909 is capable of realizing the function of the first communication unit 120, and the function of the second communication unit 150 described with reference to, for example, FIG. 2. Moreover, the communication device 909 is capable of realizing the function of the communication unit 200 described with reference to, for example, FIG. 5.

The hardware configuration of the information processing device 900 has been described above with reference to FIG. 8.

7. Summary

As described above, by using the short-distance wireless communication function, the detection device 10 that is the information processing device according to the embodiment of the present disclosure transmits a request to the mobile terminal 30 corresponding to identification information obtained beforehand. After the transmission of the request, on the basis of presence/absence of a response to the request, in other words, on the basis of whether or not a response has been received, the detection device 10 determines whether or not the mobile terminal 30 has been detected. It should be noted that the transmission and reception of the request, and the transmission and reception of the response are performed by using the short-distance wireless communication function. Accordingly, the detection device 10 and the mobile terminal 30 are capable of transmitting and receiving a request, and are capable of transmitting and receiving a response, without being influenced by a state of the network 14. In addition, since the request is transmitted to the mobile terminal 30 corresponding to the identification information obtained beforehand, no response is received from the other mobile terminals 30, or a response from the other mobile terminals 30 can be ignored.

In addition, the detection device 10 transmits a detection result of detecting the mobile terminal 30 to the cloud server 20, the detection result being based on whether or not a response has been received.

Incidentally, the mobile terminal 30 is a fixed terminal, and therefore there is a low possibility that the mobile terminal 30 will be moved to a place in which a state of the network 14 is unstable. Accordingly, the detection device 10 is capable of transmitting the detection result of detecting the mobile terminal 30 to the cloud server 20 without being influenced by the state of the network 14.

The features described above enable to provide an information processing device and an information processing method that are capable of enhancing reliability of detection processing of detecting a terminal, and that are novel and improved.

The preferable embodiments of the present disclosure have been described in detail as above with reference to the accompanying drawings. However, the technical scope of the present disclosure is not limited to such an example. It is clear that those who have ordinary skills in the technical field of the present disclosure can conceive of various correction examples or modification examples within the scope of the technical idea in the claims. It should be understood that, as a matter of course, these examples also belong to the technical scope of the present disclosure.

In addition, a series of processing performed by each unit described in the present description may be realized by using any of software, hardware, and a combination of software and hardware. A program that configures software is stored beforehand in, for example, a recording medium (non-temporary medium: non-transitory media) that is provided inside or outside each unit. Subsequently, each program is read in the RAM, for example, at the time of execution by a computer, and is then executed by a processor such as a CPU.

In addition, the processing that has been described by using the flowchart and the sequence diagram in the present description is not always required to be executed in the illustrated order. Some processing steps may be executed in a parallel manner. Moreover, an additional processing step may be employed, or processing steps may be partially omitted.

Furthermore, the effects described in the present description are to be construed as merely descriptive or illustrative, and are not limitative. In other words, the technology according to the present disclosure can achieve, along with or instead of the above effects, other effects apparent to a person skilled in the art from the statement of the present description.

It should be noted that the following configurations also belong to the technical scope of the present disclosure.

(1)

An information processing device including:

a first communication unit that transmits, by using a short-distance wireless communication function, a request to a terminal corresponding to identification information obtained beforehand;

a determination unit that determines, on the basis of presence/absence of a response from the terminal corresponding to the identification information to the request, whether or not the terminal has been detected; and a second communication unit that transmits, to other devices, a detection result based on the determination of the determination unit.

(2)

The information processing device set forth in the preceding (1), further including a storage unit that stores the identification information, in which the first communication unit cyclically transmits the request to the terminal corresponding to the identification information stored in the storage unit.

(3)

The information processing device set forth in the preceding (2), further including an identification information obtaining unit that obtains the identification information, in which the identification information obtaining unit causes the storage unit to store the identification information.

(4)

The information processing device set forth in the preceding (3), in which the identification information obtaining unit obtains the identification information of the terminal by performing pairing between the information processing device and the terminal by using the short-distance wireless communication function of the first communication unit.

(5)

The information processing device set forth in any one of the preceding (1) to (4), in which, in a case where the response to the request has been received from the terminal after the request is transmitted until predetermined time elapses, the determination unit determines that the terminal has been detected, whereas in a case where the response has not been received after the request is transmitted until the predetermined time elapses, the determination unit determines that the terminal has not been detected.

(6)

The information processing device set forth in any one of the preceding (1) to (5), further including a detection control unit that controls detection processing of detecting the terminal, in which according to the detection result, the detection control unit changes a cycle in which the first communication unit transmits the request.

(7)

The information processing device set forth in the preceding (1), in which, when the detection result of detecting the terminal has changed, the second communication unit transmits the detection result to the other devices.

(8)

The information processing device set forth in the preceding (2), in which the first communication unit transmits the request to the terminal other than the terminals to which the request is transmitted from other information processing devices, among a plurality of the terminals corresponding to the identification information stored in the storage unit.

(9)

The information processing device set forth in the preceding (8), in which the first communication unit transmits the request to the terminal in which the time after the request is transmitted until the response is received is shorter than the time after the other information processing devices transmit the request until the response is received.

(10)

The information processing device set forth in any one of the preceding (1) to (9), in which the first communication unit uses Bluetooth (registered trademark) as the short-distance wireless communication function.

(11)

An information processing device including:

a communication unit that receives a detection result of detecting a terminal having a short-distance wireless communication function from the information processing device that detects the terminal and that transmits information related to a location of a user who is an owner of the terminal; and a control unit that controls processing of transmitting information related to the location of the user based on the detection result.

(12)

The information processing device set forth in the preceding (11), further including a storage unit that stores the detection result, in which the terminal, the user, and terminals of other users related to the user are stored in the storage unit by being associated with one another, and the control unit causes the communication unit to transmit the information related to the location of the user to the terminals of the other users associated with the user.

(13)

The information processing device set forth in the preceding (12), in which, on the basis of a plurality of results of responses from a plurality of the terminals to requests transmitted from the information processing device that detects the terminal to the plurality of the terminals, the control unit causes the communication unit to transmit the information related to the location of the user to the terminals of the other users associated with the user.

(14)

The information processing device set forth in the preceding (12), in which the terminal and the detection result of detecting the terminal are stored in the storage unit by being associated with each other.

(15)

An information processing method executed by a processor, the information processing method including:

by using a short-distance wireless communication function, transmitting a request to a terminal corresponding to identification information obtained beforehand;

on the basis of presence/absence of a response from the terminal corresponding to the identification information to the request, determining whether or not the terminal has been detected; and transmitting a detection result based on the determination to other devices.

REFERENCE SIGNS LIST

10 Detection device
14 Network
20 Cloud server
30 Mobile terminal

The invention claimed is:

1. A stationary information processing device comprising:
   first communication circuitry of the stationary information processing device configured to transmit, by using a short-distance wireless communication function, a request to a mobile terminal corresponding to identification information of the mobile terminal obtained beforehand;
   determination circuitry of the stationary information processing device configured to selectively determine, based on presence/absence of the stationary information processing device receiving a response to the request from the mobile terminal corresponding to the identification information of the mobile terminal, whether or not the mobile terminal has been detected by the stationary information processing device; and
   second communication circuitry of the stationary information processing device configured to transmit, to other devices, a detection result based on the determination of the determination circuitry, at least one of the other devices being another mobile terminal,
   wherein the detection result indicates one of (i) that the mobile terminal is detected by the stationary information processing device and (ii) that the mobile terminal is not detected by the stationary information processing device.

2. The stationary information processing device according to claim 1, further comprising:
   a storage circuitry configured to store the identification information of the mobile terminal,
   wherein the first communication circuitry cyclically transmits the request to the mobile terminal corresponding to the identification information stored in the storage circuitry.

3. The stationary information processing device according to claim 2, further comprising:
   identification information obtaining circuitry configured to obtain the identification information of the mobile terminal,
   wherein the identification information obtaining circuitry is configured to cause the storage circuitry to store the identification information of the mobile terminal.

4. The stationary information processing device according to claim 3, wherein the identification information obtaining circuitry is configured to obtain the identification information of the mobile terminal by performing pairing between the stationary information processing device and the mobile terminal by using the short-distance wireless communication function of the first communication circuitry.

5. The stationary information processing device according to claim 2, wherein the first communication circuitry transmits the request to the mobile terminal other than the terminals to which the request is transmitted from other stationary information processing devices, among a plurality of the mobile terminals corresponding to the identification information stored in the storage circuitry.

6. The stationary information processing device according to claim 5, wherein the first communication circuitry transmits the request to the mobile terminal in which a first time after the request is transmitted until the response is received is shorter than a second time after the other stationary information processing devices transmit the request until the response is received.

7. The stationary information processing device according to claim 1, wherein, in a first case where the response to the request has been received from the mobile terminal after the request is transmitted until a predetermined time elapses, the determination circuitry determines that the mobile terminal has been detected, whereas in a second case where the response has not been received after the request is transmitted until the predetermined time elapses, determination circuitry determines that the mobile terminal has not been detected.

8. The stationary information processing device according to claim 1, further comprising:
  detection circuitry configured to control detection processing of detecting the mobile terminal, wherein according to the detection result, the detection circuitry changes a cycle in which the first communication circuitry transmits the request.

9. The stationary information processing device according to claim 1, wherein, when the detection result of detecting the mobile terminal has changed, the second communication circuitry transmits the detection result to the other devices.

10. The stationary information processing device according to claim 1, wherein the first communication circuitry uses a short-range, low power wireless technology standard as the short-distance wireless communication function.

11. An information processing device comprising:
  circuitry configured to
  receive a detection result of detecting a mobile terminal from a stationary information processing device that detects the mobile terminal according to a short-distance wireless communication function, and that transmits information related to a location of a user who is an owner of the mobile terminal, and
  control processing of transmitting information related to the location of the user based on the detection result,
  wherein the detection result indicates one of (i) that the mobile terminal is detected by the stationary information processing device and (ii) that the mobile terminal is not detected b the stationary information processing device,
  wherein under a first condition that the detection result received by the information processing device indicates that the mobile terminal is detected by the stationary information processing device, transmit to another mobile terminal a first notification that the mobile terminal is at a location associated with the stationary information processing device, and
  wherein under a second condition that the detection result received by the information processing device indicates that the mobile terminal is not detected b the stationary information processing device, transmit to the another mobile terminal a second notification that the mobile terminal is not at the location associated with the stationary information processing device.

12. The information processing device according to claim 11, further comprising:
  storage circuitry configured to store the detection result, wherein the mobile terminal, the user, and mobile terminals of other users related to the user are stored in the storage circuitry in association with one another, and
  the circuitry transmits the information related to the location of the user to the mobile terminals of the other users associated with the user.

13. The information processing device according to claim 12, wherein, based on a plurality of results of responses from a plurality of the mobile terminals to requests transmitted from the stationary information processing device that detects the mobile terminal to the plurality of the mobile terminals, the circuitry transmits the information related to the location of the user o the mobile terminals of the other users associated with the user.

14. The information processing device according to claim 12, wherein the mobile terminal and the detection result of detecting the mobile terminal are stored in the storage circuitry in association with each other.

15. An information processing method executed by, a processor of a stationary information processing device, the information processing method comprising:
  by using a short-distance wireless communication function, transmitting, using the processor of the stationary information processing device, a request to a mobile terminal corresponding to identification information of the mobile terminal obtained beforehand;
  based on presence/absence of receipt of a response to the request from the mobile terminal corresponding to the identification information of the mobile terminal, selectively determining, using the processor of the stationary information processing device, whether or not the mobile terminal has been detected; and
  transmitting, using the processor of the stationary information processing device, a detection result based on the determination to other devices, at least one of the other devices being another mobile terminal,
  wherein the detection result indicates one of (i) that the mobile terminal is detected by the stationary information processing device and (ii) that the mobile terminal is not detected by the stationary information processing device.

16. The information processing method according to claim 15, further comprising:
  storing the identification information of the mobile terminal;
  wherein said transmitting the request includes cyclically transmitting the request to the mobile terminal corresponding to the stored identification information of the mobile terminal.

17. The information processing method according to claim 15, further comprising:
  in a first case where the response to the request has been received from the mobile terminal after the request is transmitted until a predetermined time elapses, determining that the mobile terminal has been detected; and
  in a second case where the response has not been received after the request is transmitted until the predetermined time elapses, determining that the mobile terminal has not been detected.

18. The information processing method according to claim 15, further comprising controlling detection processing of detecting the mobile terminal, wherein according to the detection result, a cycle in which the request is transmitted is changed.

19. The information processing method according to claim 15, further comprising transmitting the detection result to the other devices when the detection result of detecting the mobile terminal has changed.

20. The information processing method according to claim 15, wherein the short-distance wireless communication function is based on a short-range, low power wireless technology standard.

\* \* \* \* \*